United States Patent
Chen

(10) Patent No.: US 9,740,335 B2
(45) Date of Patent: Aug. 22, 2017

(54) TOUCH CIRCUIT, TOUCH SUBSTRATE AND TOUCH DISPLAY DEVICE

(71) Applicant: BOE TECHNOLOGY GROUP CO., LTD., Beijing (CN)

(72) Inventor: Shuo Chen, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 182 days.

(21) Appl. No.: 14/416,253

(22) PCT Filed: Apr. 16, 2014

(86) PCT No.: PCT/CN2014/075500
§ 371 (c)(1),
(2) Date: Jan. 21, 2015

(87) PCT Pub. No.: WO2015/096306
PCT Pub. Date: Jul. 2, 2015

(65) Prior Publication Data
US 2016/0018918 A1    Jan. 21, 2016

(30) Foreign Application Priority Data
Dec. 24, 2013 (CN) .......................... 2013 1 0722426

(51) Int. Cl.
*G06F 3/042* (2006.01)
*G06F 3/041* (2006.01)

(52) U.S. Cl.
CPC ............ *G06F 3/042* (2013.01); *G06F 3/0412* (2013.01)

(58) Field of Classification Search
CPC .............................. G06F 3/042; G06F 3/0412
See application file for complete search history.

(56) References Cited

U.S. PATENT DOCUMENTS

| 2010/0097354 A1* | 4/2010 | Ahn | ........................ G06F 3/042 345/175 |
| 2012/0280939 A1* | 11/2012 | Ahn | ....................... G06F 3/0412 345/175 |

FOREIGN PATENT DOCUMENTS

| CN | 1877401 A | 12/2006 |
| CN | 101251783 A | 8/2008 |
| CN | 101655644 A | 2/2010 |

(Continued)

OTHER PUBLICATIONS

Office Action in Chinese Patent Application No. 201310722426.3, dated Mar. 1, 2016.

(Continued)

*Primary Examiner* — Christopher E Leiby
(74) *Attorney, Agent, or Firm* — Brooks Kushman P.C.

(57) ABSTRACT

The present disclosure discloses a touch circuit, a touch substrate and a touch display device. The touch circuit includes a light sensing module arranged corresponding to a touch area and configured to, when the touch area receives light which meets a first preset condition, transmit a first signal transmitted via a signal input line as a sensing signal to a processor through a first sensing signal transmission line and a second sensing signal transmission line, respectively. The processor determines position information of the touch area based on a first sensing signal transmitted via the first sensing signal transmission line and a second sensing signal transmitted via the second sensing signal transmission line.

17 Claims, 3 Drawing Sheets

(56) References Cited

FOREIGN PATENT DOCUMENTS

| CN | 102566836 A | 7/2012 |
|---|---|---|
| CN | 102955604 A | 3/2013 |
| CN | 103699264 A | 4/2014 |

OTHER PUBLICATIONS

International Search Report and Written Opinion in PCT International Application No. PCT/CN2014/075500, dated Sep. 28, 2014.
Office Action in Chinese Patent Application No. 201310722426.3, dated Nov. 15, 2016.

\* cited by examiner

TOUCH CIRCUIT, TOUCH SUBSTRATE AND TOUCH DISPLAY DEVICE

CROSS-REFERENCE TO RELATED APPLICATION

This application is the U.S. national phase of PCT Application No. PCT/CN2014/075500 filed on Apr. 16, 2014, which claims a priority of the Chinese patent application No. 201310722426.3 filed on Dec. 24, 2013, which is incorporated herein by reference in its entirety.

TECHNICAL FIELD

The present disclosure relates to the field of display technology, and particularly relates to a touch circuit, a touch substrate and a touch display device.

BACKGROUND

Since an in-cell touch design that a touch sensor is inside a panel may reduce a thickness of a touch panel and greatly reduce the cost of a touch screen, thus, it has become the developing direction of touch technology.

However, the present in-cell touch design is contact touch design, i.e., using a user's finger or a touch pen to touch a surface of a display panel, causing change of induced current (voltage), and then identifying and determining a panel area which is touched based on the change of the induced current.

In the contact touch mode, a direct contact on the touch panel is required to sense touch, and non-contact touch sensing cannot be realized, which is inconvenient for a user to use a touch display device remotely.

SUMMARY

The present disclosure provides a touch circuit, a touch substrate and a touch display device, which can realize remote non-contact touch function.

One embodiment of the present disclosure provides a touch circuit including:

a light sensing module arranged corresponding to a touch area and configured to, when the touch area receives light which meets a first preset condition, transmit a first signal transmitted via a signal input line as a sensing signal to a processor through a first sensing signal transmission line and a second sensing signal transmission line, respectively; the processor determining position information of the touch area based on a first sensing signal transmitted via the first sensing signal transmission line and a second sensing signal transmitted via the second sensing signal transmission line.

Optionally, the light sensing module includes:

a light control unit, a first transmission switch and a second transmission switch.

The light control unit is connected with the signal input line, the first transmission switch, the first sensing signal transmission line, respectively. The light control unit is configured to, when being irradiated by the light, change from an off state to an on state; when the light control unit is in the on state, the first signal transmitted via the signal input line is transmitted to the first transmission switch and the first sensing signal transmission line through the light control unit.

The first transmission switch is connected with the signal input line, the light control unit and the second transmission switch, respectively; the first transmission switch is configured to, under control of the first signal, transmit the first signal to the second transmission switch.

The second transmission switch is connected with the first transmission switch, a first gate line, the second sensing signal transmission line, respectively; the second transmission switch is configured to, under control of a second signal transmitted via the first gate line, transmit the first signal transmitted by the first transmission switch to the second sensing signal transmission line.

Optionally, the light control unit includes:

a photodiode with a cathode connected with the first transmission switch and the first sensing signal transmission line at a node, and an anode connected with the signal input line.

Optionally, the first transmission switch includes:

a first thin film transistor with a source electrode connected with the signal input line, a gate electrode connected with the nod, and a drain electrode connected with a second thin film transistor.

Optionally, the second transmission switch includes:

a second thin film transistor with a source electrode connected with the first transmission switch, a gate electrode connected with the first gate line, and a drain electrode connected with the second sensing signal transmission line.

Optionally, the signal input line and the first sensing signal transmission line are arranged parallel to the first gate line;

the second sensing signal transmission line is arranged parallel to a data line included in the touch area.

Optionally, the first sensing signal is configured to determine a row coordinate of the touch area;

the second sensing signal is configured to determine a column coordinate of the touch area.

Optionally, the first preset condition is determined based on irradiation intensity, wavelength and frequency of the light.

Optionally, the light is laser.

Optionally, the light is infrared ray or ultraviolet ray.

Optionally, the touch circuit further includes a pixel region, a thin film transistor and a capacitor.

One embodiment of the present disclosure further provides a touch substrate specifically including the touch circuit of the above embodiment of the present disclosure.

Optionally, the touch substrate is an array substrate.

Optionally, a black matrix is not provided above the light control unit of the touch substrate.

One embodiment of the present disclosure further provides a touch display device specifically including the touch substrate of the above embodiment of the present disclosure.

It may be seen from the above that in the touch circuit, the touch substrate and the touch display device provided in the present disclosure, the touch circuit includes the light sensing module arranged corresponding to the touch area and configured to, when the touch area receives light which meets the first preset condition, transmit the first signal transmitted via the signal input line as the sensing signal to the micro controller unit through the first sensing signal transmission line and the second sensing signal transmission line, respectively. The micro controller unit determines position information of the touch area based on the first sensing signal transmitted via the first sensing signal transmission line and the second sensing signal transmitted via the second sensing signal transmission line. Thus, the remote non-contact touch function may be realized, and this may facilitate the user to use the touch display device.

DETAILED DESCRIPTION

In order to make objects, technical details and advantages of the embodiments of the present disclosure apparent, hereinafter, the technical solutions of the embodiments of the present disclosure will be described in a clearly and fully understandable way in connection with the drawings related to the embodiments of the present disclosure. It is obvious that the described embodiments are just a part but not all of the embodiments of the present disclosure. Based on the described embodiments of the present disclosure, those skilled in the art can obtain other embodiment(s), without any inventive work, which should be within the scope sought for protection by the present disclosure.

Unless otherwise defined, the technical or scientific terminology used herein should have the same meaning as commonly understood by one of ordinary skill in the art to which this invention belongs. Terms such as "first", "second" and the like used in specification and claims of the patent application of the invention do not show any order, number or importance, but are only used to distinguish different constituent parts. Likewise, a term "a," "an," or the like does not indicate limitation in number, but specifies the presence of at least one. A term such as "connect," "couple," or the like is not limited to physical or mechanical connection, but can include electrical connection, whether directly or indirectly. "Upper," "lower," "left," "right" or the like is only used to describe a relative positional relationship, and when the absolute position of a described object is changed, the relative positional relationship might also be changed accordingly.

Figure 1:
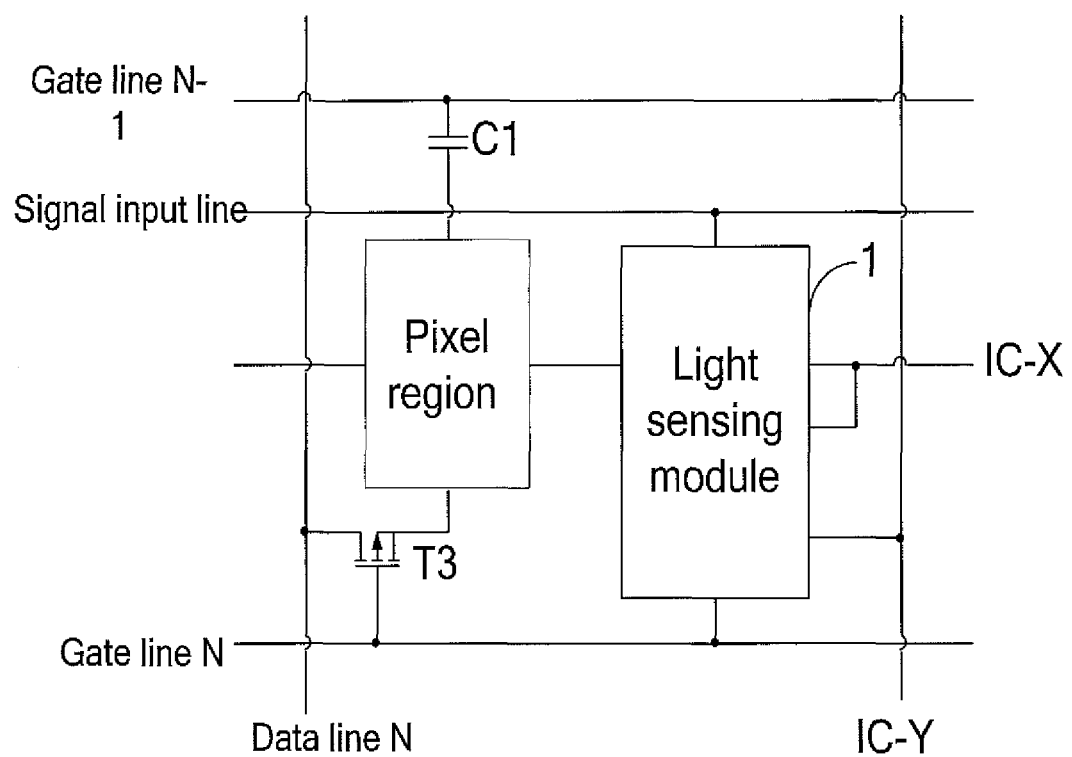
FIG. 1 is a schematic diagram of a touch circuit according to one embodiment of the present disclosure.

One embodiment of the present disclosure provides a touch circuit. As shown in FIG. 1, the touch circuit may specifically include:

a light sensor module 1 corresponding to a touch area and configured to, when the touch area receives light which meets a first preset condition, transmit a first signal transmitted via a signal input line as a sensing signal to a micro controller unit (MCU) through a first sensing signal transmission line IC-X and a second sensing signal transmission line IC-Y, respectively. The MCU determines position information of the touch area based on a first sensing signal transmitted via the first sensing signal transmission line and a second sensing signal transmitted via the second sensing signal transmission line.

The touch circuit provided in one embodiment of the present disclosure may realize non-contact touch function, thereby facilitating a user to use the touch display device remotely.

The remote non-contact touch function realized in one embodiment of the present disclosure may be realized based on light which meets the first preset condition and is emitted from a hand-held or fixed light source. That is, a remote non-contact touch operation on a panel may be realized by light instead of the user's hand or stylus.

The first preset condition of one embodiment of the present disclosure may be determined based on irradiation intensity, wavelength and frequency of the light, so as to avoid interference of ambient light to the non-contact touch operation. In one specific embodiment, the light of one embodiment of the present disclosure may specifically be laser, and the light source may be a laser pen or other devices. Further, the light of one embodiment of the present disclosure may also be infrared ray, ultraviolet ray, etc.

As shown in FIG. 1, a pixel area to which the touch circuit of one embodiment of the present disclosure belongs, may specifically include a pixel region, a thin film transistor T3, a capacitor C1 and other devices required in the pixel region.

Figure 2:
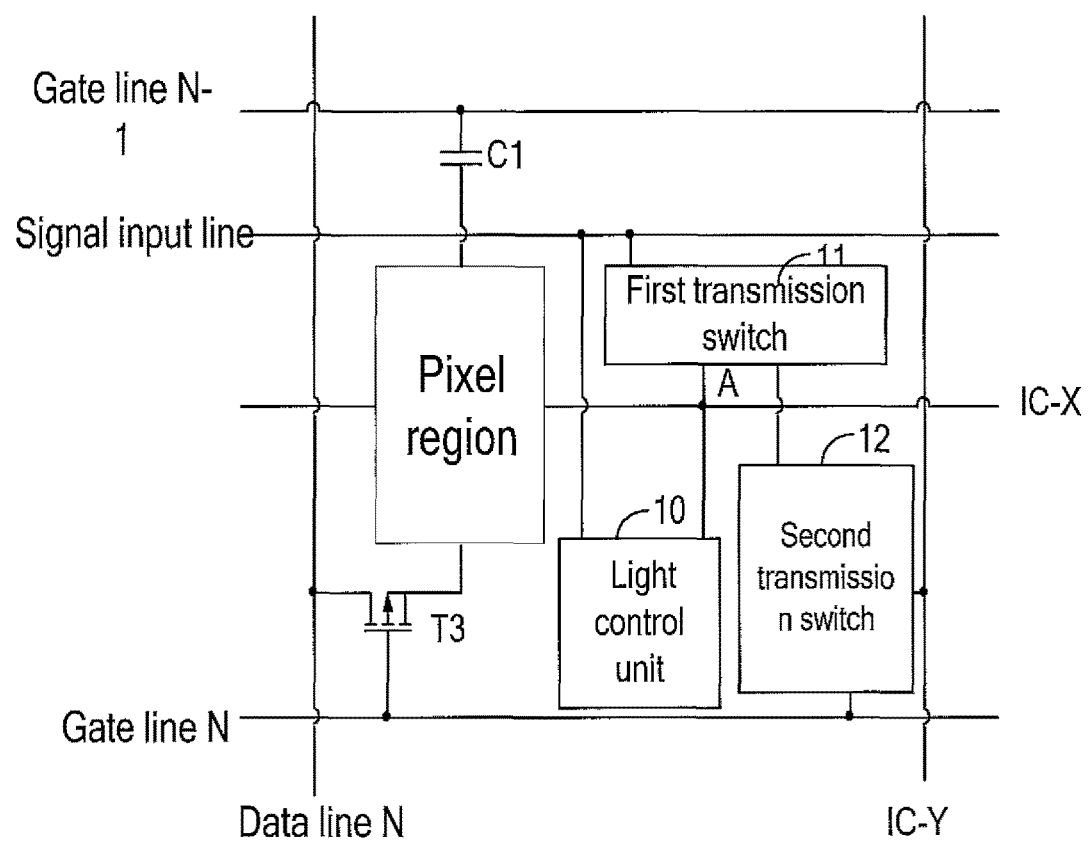
FIG. 2 is a schematic diagram of a touch circuit according to another embodiment of the present disclosure.

In one specific embodiment of the present disclosure, as shown in FIG. 2, the light sensing module 1 of one embodiment of the present disclosure may specifically include:

a light control unit 10, a first transmission switch 11 and a second transmission switch 12.

The light control unit 10 is connected with the signal input line, the first transfer switch 11, the first sensing signal transmission line IC-X, respectively. The light control unit 10 is configured to, when being irradiated by the light, change from an off state to an on state. When the light control unit 10 is in the on state, the first signal transmitted via the signal input line is transmitted to the first transmission switch 11 and the first sensing signal transmission line IC-X through the light control unit 10.

The first transmission switch 11 is connected with the signal input line, the light control unit 10 and the second transmission switch 12, respectively. The first transmission switch 11 is configured to, under control of the first signal, transmit the first signal to the second transmission switch 12.

The second transmission switch 12 is connected with the first transmission switch 11, a first gate line (gate line N), the second sensing signal transmission line IC-Y, respectively. The second transmission switch 12 is configured to, under control of a second signal (i.e., gate driving signal) transmitted via the first gate line, transmit the first signal transmitted by the first transmission switch 11 to the second sensing signal transmission line IC-Y.

As shown in FIGS. 1-2, the signal input line and the first sensing signal transmission line IC-X of one embodiment of the present disclosure may be arranged parallel to the first gate line (gate line N). The first gate line of one embodiment of the present disclosure may be a gate line belonging to a pixel row in which the touch circuit is, and may also be a gate line belonging to another pixel row.

Similarly, as shown in FIGS. 1-2, the second sensing signal transmission line IC-Y of one embodiment of the present disclosure may be arranged parallel to a data line included in the touch area.

The signal input line, the first sensing signal transmission line and the second sensing signal transmission line of one embodiment of the present disclosure are not connected to each other. The arrangement of these three signal lines cannot affect luminescence of the pixel region of the touch circuit and cannot affect light's irradiation on the light sensing module 1.

In one specific embodiment, the signal input line and the first sensing signal transmission line of one embodiment of the present disclosure may be provided in a same layer as the first gate line, and the second sensing signal transmission line of one embodiment of the present disclosure may be provided in a same layer as the data line.

The first signal transmitted via the signal input line of one embodiment of the present disclosure may be a signal having a fixed voltage (e.g., 10V). When the first signal is transmitted to the first sensing signal transmission line IC-X through the light control unit 10, the first signal, as the first sensing signal, is transmitted to a back-end processor via the first sensing signal transmission line. Based on an identifier of first sensing signal transmission line carried in the first sensing signal, the processor determines a row coordinate of the touch area irradiated by the light. When the first signal is transmitted to the second sensing signal transmission line IC-Y through the first transmission switch 11 and the second transmission switch 12, the first signal, as the second sensing signal, is transmitted to the back-end processor through the second sensing signal transmission line. Based on an identifier of second sensing signal transmission line carried in the second sensing signal, the processor determines a column coordinate of the touch area irradiated by the light. Then, based on the determined row coordinate and column coordinate, position information of the touch area irradiated by the light may be determined, thereby determining position information of the pixel region irradiated by the light. Subsequently, the determined pixel region may be controlled based on actual needs, for example, driving and controlling the pixel region to emit light, etc.

Figure 3:
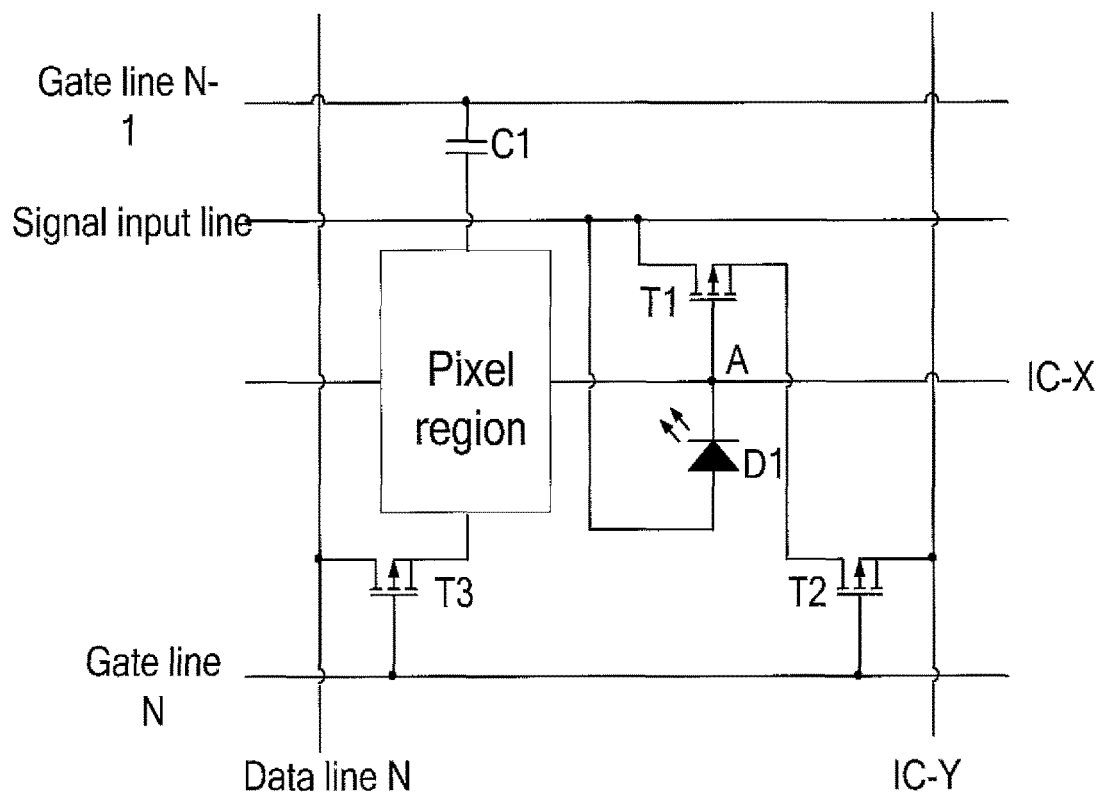
FIG. 3 is a schematic diagram of a touch circuit according to yet another embodiment of the present disclosure.

In one specific embodiment, as shown in FIG. 3, the light control unit 10 of one embodiment of the present disclosure may specifically include:

a photodiode D1 with a cathode connected with the first transmission switch 11 and the first sensing signal transmission line IC-X at a node A, and an anode connected with the signal input line.

The photodiode D1 of one embodiment of the present disclosure may change from an off state to an on state when being irradiated by intense light such as laser, thus, the photodiode D1 may realize the function of the light control unit 10 of one embodiment of the present disclosure. When the photodiode D1 is irradiated by intense light, the first signal transmitted via the signal input line may be transmitted to the first transmission switch 11 and the first sensing signal transmission line through the photodiode D1.

Similarly, as shown in FIG. 3, the first transmission switch 11 of one embodiment of the present disclosure may specifically include:

a first thin film transistor T1 with a source electrode connected with the signal input line, a gate electrode connected with the node A, and a drain electrode connected with a second thin film transistor T2.

Since the gate electrode of the first thin film transistor T1 is connected with the node A, thus, the on sate or off state of the first thin film transistor T1 may be determined by a potential at the node A. Then, when the photodiode D1 is irradiated by intense light and is in the on state, the potential at the node A is charged by the first signal transmitted via the signal input line to a high potential, so that the first thin film transistor T1 is in the on state. When the first thin film transistor T1 is in the on state, the first signal transmitted by the signal input line connected with the source electrode of the first thin film transistor T1 is transmitted to the second thin film transistor T2 through the first thin film transistor T1.

Similarly, as shown in FIG. 3, the second transmission switch 12 of one embodiment of the present disclosure may specifically include:

the second thin film transistor T2 with a source electrode connected with the first transmission switch 11 (drain electrode of the first transmission switch 11), a gate electrode connected with the first gate line (gate line N), and a drain electrode connected with the second sensing signal transmission line (IC-Y).

Since the gate driving signal transmitted via the first gate line in the on state is a high level signal, thus, when the first gate line transmits the gate driving signal in one scanning cycle, the second thin film transistor T2 is in the on state. Therefore, the first signal transmitted via the signal input line is transmitted to the second sensing signal transmission line through the first thin film transistor T1 and the second thin film transistor T2.

Through the touch circuit provided in the above embodiment of the present disclosure, the non-contact touch function may be realized by means of the light emitted from the light source.

One embodiment of the present disclosure further provides a touch substrate, which may specifically include the touch circuit provided in the above embodiment of the present disclosure.

In one specific embodiment, the touch substrate provide in one embodiment of the present disclosure may specifically be an array substrate.

For the light sensing module 1 receiving light irradiation, a light shielding pattern layer such as a black matrix is not set above the light sensing module 1 in the touch substrate of one embodiment of the present disclosure.

One embodiment of the present disclosure further provides a touch display device, which may specifically include the touch substrate provided in the above embodiment of the present disclosure.

The touch display device may specifically be a liquid crystal panel, a liquid crystal television, a liquid crystal monitor, an OLED panel, an OLED monitor, a plasma monitor, an electronic paper or other device.

It may be seen from the above that in the touch circuit, the touch substrate and the touch display device provided in embodiments of the present disclosure, the touch circuit includes the light sensing module arranged corresponding to the touch area and configured to, when the touch area receives light which meets the first preset condition, transmit the first signal transmitted by the signal input line as the sensing signal to the micro controller unit through the first sensing signal transmission line and the second sensing signal transmission line, respectively. The micro controller unit determines position information of the touch area based on the first sensing signal transmitted via the first sensing signal transmission line and the second sensing signal transmitted via the second sensing signal transmission line. Thus, the remote non-contact touch function may be realized, and this may facilitate the user to use the touch display device.

Those described above are only embodiments of the present disclosure. It should be noted that, for those skilled in the art, improvements and substitutions may also be made without departing from the principle of the present disclosure. Those improvements and substitutions should also be considered as falling within the scope of the present disclosure.

What is claimed is:

1. A touch circuit comprising:
a light sensing module arranged corresponding to a touch area and configured to, when the touch area receives light which meets a first preset condition, transmit a first signal transmitted via a signal input line as a sensing signal to a processor through a first sensing signal transmission line and a second sensing signal transmission line, respectively; wherein the processor determines position information of the touch area based on a first sensing signal transmitted via the first sensing signal transmission line and a second sensing signal transmitted via the second sensing signal transmission line,
wherein the position information of the touch area comprises a row coordinate and a column coordinate of the touch area; and
wherein the light sensing module comprises:

a light control unit, a first transmission switch and a second transmission switch; wherein the light control unit is connected with the signal input line, the first transmission switch, the first sensing signal transmission line, respectively; the light control unit is configured to, when being irradiated by the light, change from an off state to an on state; when the light control unit is in the on state, the first signal transmitted via the signal input line is transmitted to the first transmission switch and the first sensing signal transmission line through the light control unit;

the first transmission switch is connected with the signal input line, the light control unit and the second transmission switch, respectively; the first transmission switch is configured to, under the control of the first signal, transmit the first signal to the second transmission switch;

the second transmission switch is connected with the first transmission switch, a first gate line, the second sensing signal transmission line, respectively; the second transmission switch is configured to, under the control of a second signal transmitted via the first gate line, transmit the first signal transmitted by the first transmission switch to the second sensing signal transmission line.

2. The touch circuit of claim 1, wherein the light control unit comprises:

a photodiode with a cathode connected with the first transmission switch and the first sensing signal transmission line at a node, and an anode connected with the signal input line.

3. The touch circuit of claim 2, wherein the first transmission switch comprises:

a first thin film transistor with a source electrode connected with the signal input line, a gate electrode connected with the node, and a drain electrode connected with a second transmission switch.

4. The touch circuit of claim 2, wherein the second transmission switch comprises:

a second thin film transistor with a source electrode connected with the first transmission switch, a gate electrode connected with the first gate line, and a drain electrode connected with the second sensing signal transmission line.

5. The touch circuit of claim 1, wherein the signal input line and the first sensing signal transmission line are arranged parallel to the first gate line;

the second sensing signal transmission line is arranged parallel to a data line included in the touch area.

6. The touch circuit of claim 1, wherein the first preset condition is determined based on irradiation intensity, wavelength and frequency of the light.

7. The touch circuit of claim 1, wherein the light is laser.

8. The touch circuit of claim 1, wherein the light is infrared ray or ultraviolet ray.

9. The touch circuit of claim 1, further comprising a pixel region, a thin film transistor and a capacitor.

10. A touch substrate comprising the touch circuit of claim 1.

11. The touch substrate of claim 10, wherein the touch substrate is an array substrate.

12. The touch substrate of claim 10, wherein a black matrix is not provided above the light control unit of the touch substrate.

13. A touch display device comprising the touch substrate of claim 10.

14. The touch substrate of claim 11, wherein a black matrix is not provided above the light control unit of the touch substrate.

15. The touch display device of claim 13, wherein the touch substrate is an array substrate.

16. The touch display device of claim 13, wherein a black matrix is not provided above the light control unit of the touch substrate.

17. The touch display device of claim 15, wherein a black matrix is not provided above the light control unit of the touch substrate.

* * * * *